United States Patent
Kageyama et al.

(10) Patent No.: US 8,484,491 B2
(45) Date of Patent: Jul. 9, 2013

(54) POWER SUPPLY APPARATUS AND POWER SUPPLY CONTROL METHOD

(75) Inventors: Hironobu Kageyama, Kawasaki (JP); Takashi Sato, Kawasaki (JP); Yuki Chiba, Kawasaki (JP); Koki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 378 days.

(21) Appl. No.: 12/805,097

(22) Filed: Jul. 12, 2010

(65) Prior Publication Data

US 2011/0010568 A1 Jan. 13, 2011

(30) Foreign Application Priority Data

Jul. 13, 2009 (JP) .................. 2009-164727

(51) Int. Cl.
*G06F 1/26* (2006.01)
(52) U.S. Cl.
USPC ........................................ 713/300
(58) Field of Classification Search
None
See application file for complete search history.

(56) References Cited

U.S. PATENT DOCUMENTS

| 5,612,581 | A  | * | 3/1997 | Kageyama | 307/64 |
| 7,089,435 | B2 | * | 8/2006 | Kawakubo | 713/300 |
| 2005/0182981 | A1 | * | 8/2005 | Hayashi | 713/320 |
| 2006/0053309 | A1 | * | 3/2006 | Vereen et al. | 713/300 |
| 2008/0067995 | A1 | * | 3/2008 | Chua-Eoan et al. | 323/284 |

FOREIGN PATENT DOCUMENTS

| JP | 7-15888 | 1/1995 |
| JP | 7-336915 | 12/1995 |
| JP | 9-37486 | 2/1997 |

* cited by examiner

*Primary Examiner* — Kim Huynh
*Assistant Examiner* — Austin Hicks
(74) *Attorney, Agent, or Firm* — Staas & Halsey LLP

(57) ABSTRACT

A main power supply and a backup power supply have the same set voltage. To prevent electrical power from being supplied from the backup power supply to a load circuit, during a normal operation, a power supply control unit gives a standby instruction to the backup power supply so that the backup power supply is on standby at a voltage lower than that of the main power supply. When an AC power supply is stopped, the backup power supply is operated at the set voltage and the main power supply is stopped.

6 Claims, 9 Drawing Sheets

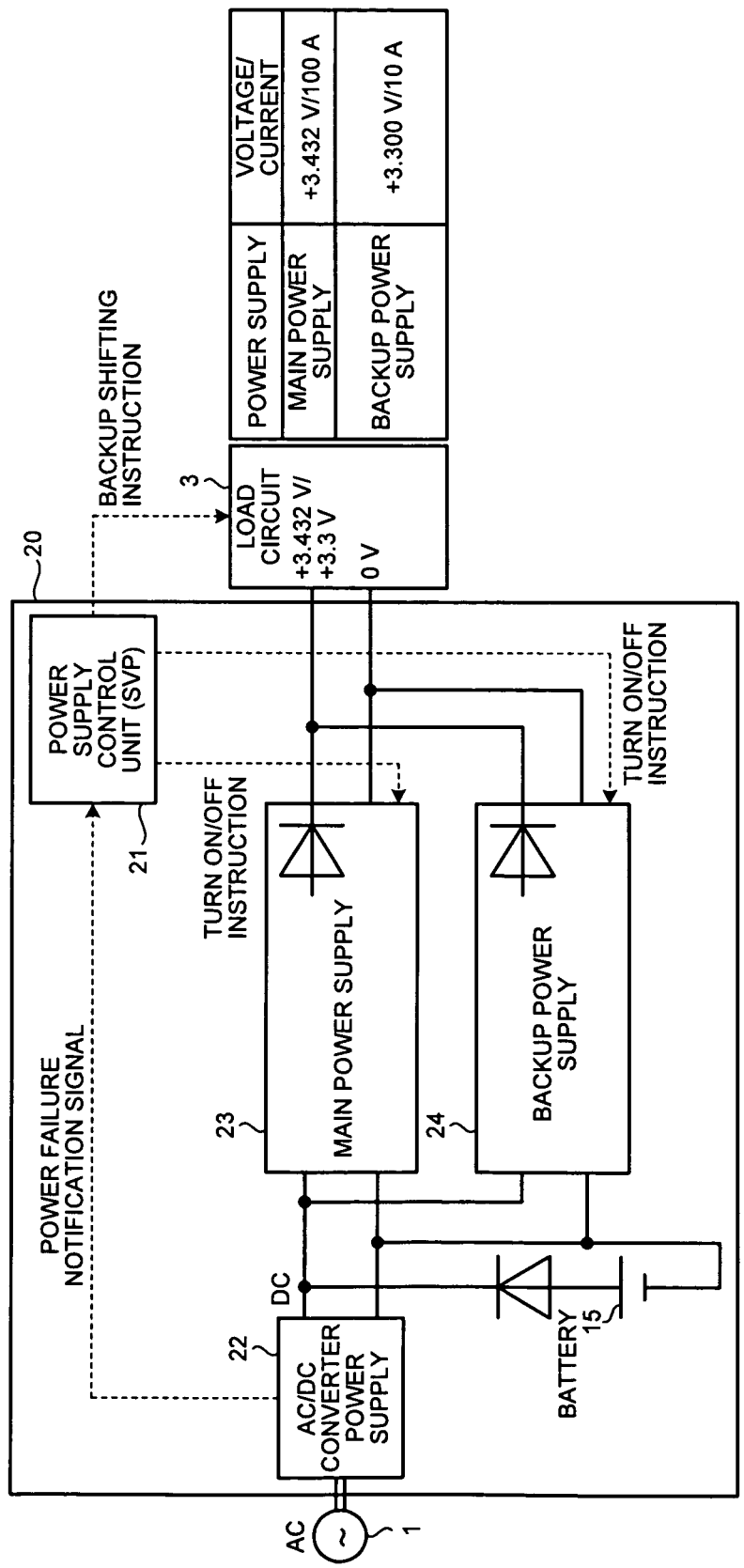

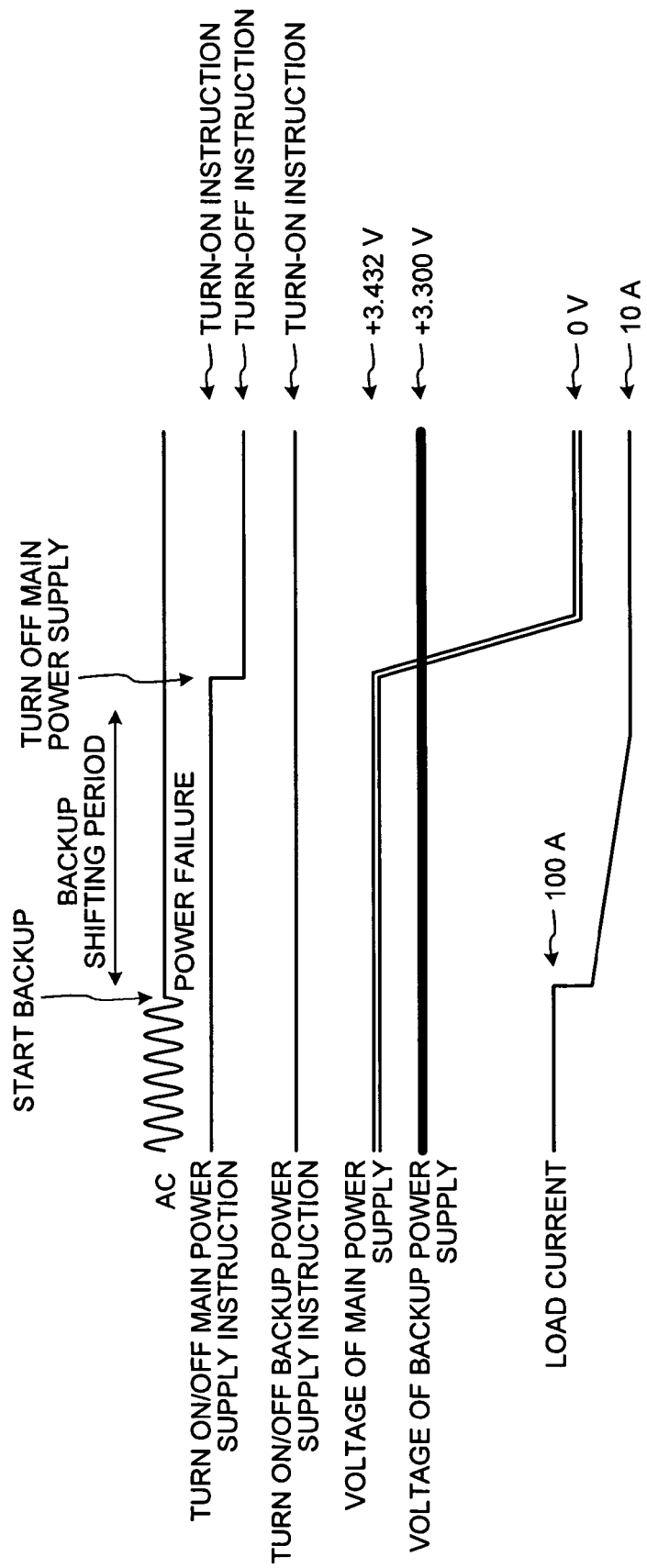

FIG.5A
[EFFICIENCY CURVE OF MAIN POWER SUPPLY]
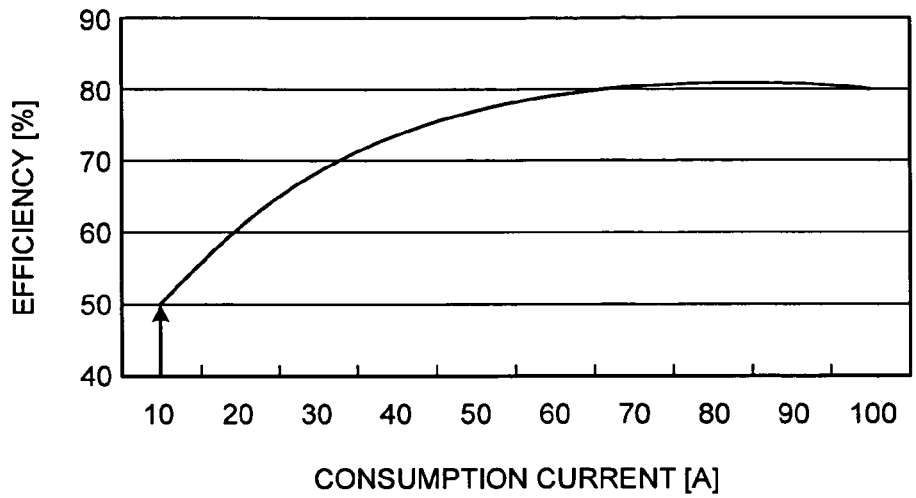
FIG.5B
[EFFICIENCY CURVE OF BACKUP POWER SUPPLY]
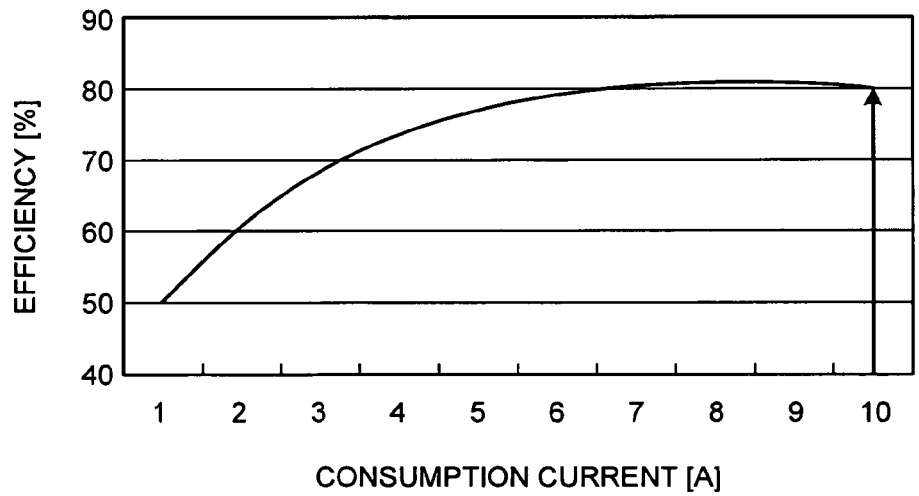
FIG.6
| POWER SUPPLY | VOLTAGE/ CURRENT | LOAD CURRENT DURING BACKUP | EFFI- CIENCY | POWER SUPPLY LOSS |
|---|---|---|---|---|
| MAIN POWER SUPPLY | +3.432 V/100 A | 10 A | 50 % | 34.3 W |
| BACKUP POWER SUPPLY | +3.300 V/10 A | | 80 % | 8.3 W |

FIG.8

| | STATE | FEEDBACK | VA | FET Q1 |
|---|---|---|---|---|
| 1 | NORMAL OPERATION (STANDBY SIGNAL : STANDBY INSTRUCTION) | INSTRUCTION TO LOWER VOLTAGE | ·RETENTION VOLTAGE (CONTROL AT VK×0.97)<br>·VARY RESISTANCE USING STANDBY CONTROL CIRCUIT TO SET OUTPUT VOLTAGE AT -25% typ PROVIDED THAT, DUE TO FEEDBACK FROM REMOTE SENCE, OUTPUT VOLTAGE BECOMES RETENTION VOLTAGE | OFF |
| 2 | BATTERY BACKUP OPERATION (STANDBY SIGNAL : STANDBY INSTRUCTION) | OPERATION TO KEEP VOLTAGE OF REMOTE SENCE CONSTANT | NORMAL VA | ON |

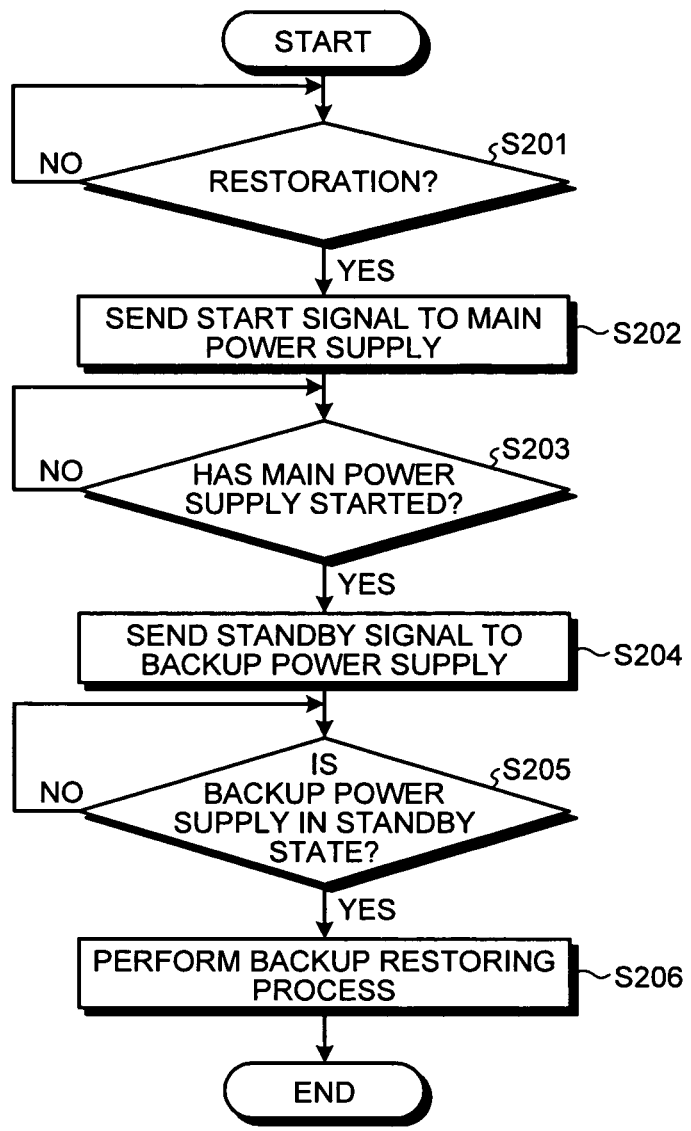

POWER SUPPLY APPARATUS AND POWER SUPPLY CONTROL METHOD

CROSS-REFERENCE TO RELATED APPLICATION

This application is based upon and claims the benefit of priority of the prior Japanese Patent Application No. 2009-164727, filed on Jul. 13, 2009, the entire contents of which are incorporated herein by reference.

FIELD

The embodiments of the present invention discussed herein relate to a power supply apparatus and a power supply control method.

BACKGROUND

Power supply apparatuses that include a main power supply and a backup power supply are typically used as power supply apparatuses to supply a power to information processing apparatuses. Power supply apparatuses convert an alternating current to a direct current and supply it to information processing apparatuses i.e., load circuits. The main power supply supplies electrical power when an AC (Alternating Current) power supply is in operation, whereas the backup power supply supplies electrical power when the AC power supply is stopped due to a power failure, for example.

Because the information processing apparatuses perform arithmetic processing during normal operation, load consumption currents thereof are large. Because the main power supply supplies electrical power during such normal operation, the capacity thereof needs to be large.

In contrast, when the AC power supply is stopped due to, for example, a power failure, the information processing apparatuses shift to a backup state. In the backup state, the arithmetic processing is not performed, and an operation that uses a minimum of power, such as memory retaining, is performed. These functions of reducing electrical power consumption and retaining data in this way when a power failure occurs are called a battery backup function or the like.

With a large-capacity power supply such as the main power supply, if the load current is small, the power conversion efficiency is reduced. Accordingly, when the information processing apparatus is in a backup state and electrical power consumption thereof is reduced, the conversion efficiency of electrical power increases if a lower-capacity backup power supply is used; therefore, it is possible to reduce the overall electrical power consumption by reducing the electrical power loss.

However, if electrical power is supplied from the backup power supply to the information processing apparatus during normal operation, there is a possibility that the backup power supply may go down due to, for example, abnormal temperatures because the power supply does not meet demand. Accordingly, when the information processing apparatus is in normal operation, electrical power needs to be supplied from the main power supply.

In contrast, if the backup power supply is stopped when the information processing apparatus is in normal operation, even when an abnormality occurs in the backup power supply, the abnormality cannot be detected. Because the backup power supply is needed at a time of emergency, such as a power failure, it is too late if an abnormal operation is detected only after starting the backup power supply.

Accordingly, power supply apparatuses are typically configured such that the voltage of the main power supply is set higher than that of the backup power supply, and, when the information processing apparatus is in normal operation, electrical power is supplied from the main power supply to the information processing apparatus while operating the backup power supply.

The conventional technologies as described above are disclosed in for example Japanese Laid-open Patent Publication Nos. 07-336915, 07-15888, and 09-37486.

In recent years, because the voltages of large scale integrated circuits (LSI) have been lowered, load voltages of information processing apparatuses are now set to +1.2 V or +1.8 V. Even when an attempt is made to set the voltage of the main power supply higher than that of the backup power supply, the allowable range of the operation voltage of the information processing apparatus or the setting range of the output of the power supply is small, which means high accuracy is required. Accordingly, there is a problem in that setting becomes difficult.

To prevent power from being supplied by the backup power supply when the information processing apparatus is in normal operation, the difference in voltage between the main power supply and the backup power supply needs to be set in such a manner that the output of the main power supply does not interfere with the output of the backup power supply, i.e., the two voltages do not match. For example, if the load voltage is +1.2 V and the output accuracy of the power supply is ±5%, to avoid interference even when the output of the main power supply falls by 5% and the output of the backup power supply rises by 5%, a potential difference of 10% or more is needed. Accordingly, when the output voltage of the main power supply is 1.2 V+0.12 V=1.32 V, the output voltage exceeds the load voltage allowable range, i.e., 1.2 V±5% (1.14 to 1.26 V).

In this way, by setting a voltage difference between the main power supply and the backup power supply, the conventional technology for preventing electrical power from being supplied from the backup power supply to the information processing apparatus that is in normal operation cannot be used if the information processing apparatus load voltage is low, which is a problem.

SUMMARY

According to an aspect of an embodiment of the invention, a power supply apparatus includes a converter circuit that converts an alternating current output from an AC power supply to a direct current; a battery that is charged by the direct current output from the converter circuit; a first power supply circuit that outputs, from either one of the converter circuit and the battery to a load circuit, a first voltage that is within an allowable range of a load voltage of the load circuit; a second power supply circuit that outputs, from either one of the converter circuit and the battery to the load circuit, either one of a second voltage that is within the allowable range and a third voltage that is lower than the first voltage; and a power supply control unit that causes the first power supply circuit to output the first voltage and causes the second power supply circuit to output the third voltage, when the alternating current is output from the AC power supply, and the power supply control unit causing the second power supply circuit to output the second voltage and causes the first power supply circuit to stop outputting the first voltage, when the AC power supply is stopped.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating, in outline, the configuration of a comparative example with which the configuration illustrated in FIG. 1 is compared;

FIG. 4 is a schematic diagram explaining an operation of the comparative example illustrated in FIG. 3;

FIG. 5A is a graph exhibiting the efficiency of a main power supply;

FIG. 5B is a graph exhibiting the efficiency of a backup power supply;

FIG. 6 is a schematic diagram explaining a loss of the main power supply and the backup power supply during a backup mode in the comparative example;

FIG. 8 is a schematic diagram explaining an operation of the backup power supply 14;

FIG. 10 is a flowchart explaining an operation performed by the power supply control unit 11 when a backup is restored.

DESCRIPTION OF EMBODIMENTS

Preferred embodiments of the present invention will be explained with reference to accompanying drawings. The disclosed technology is not limited to the embodiment described below.

Figure 1:
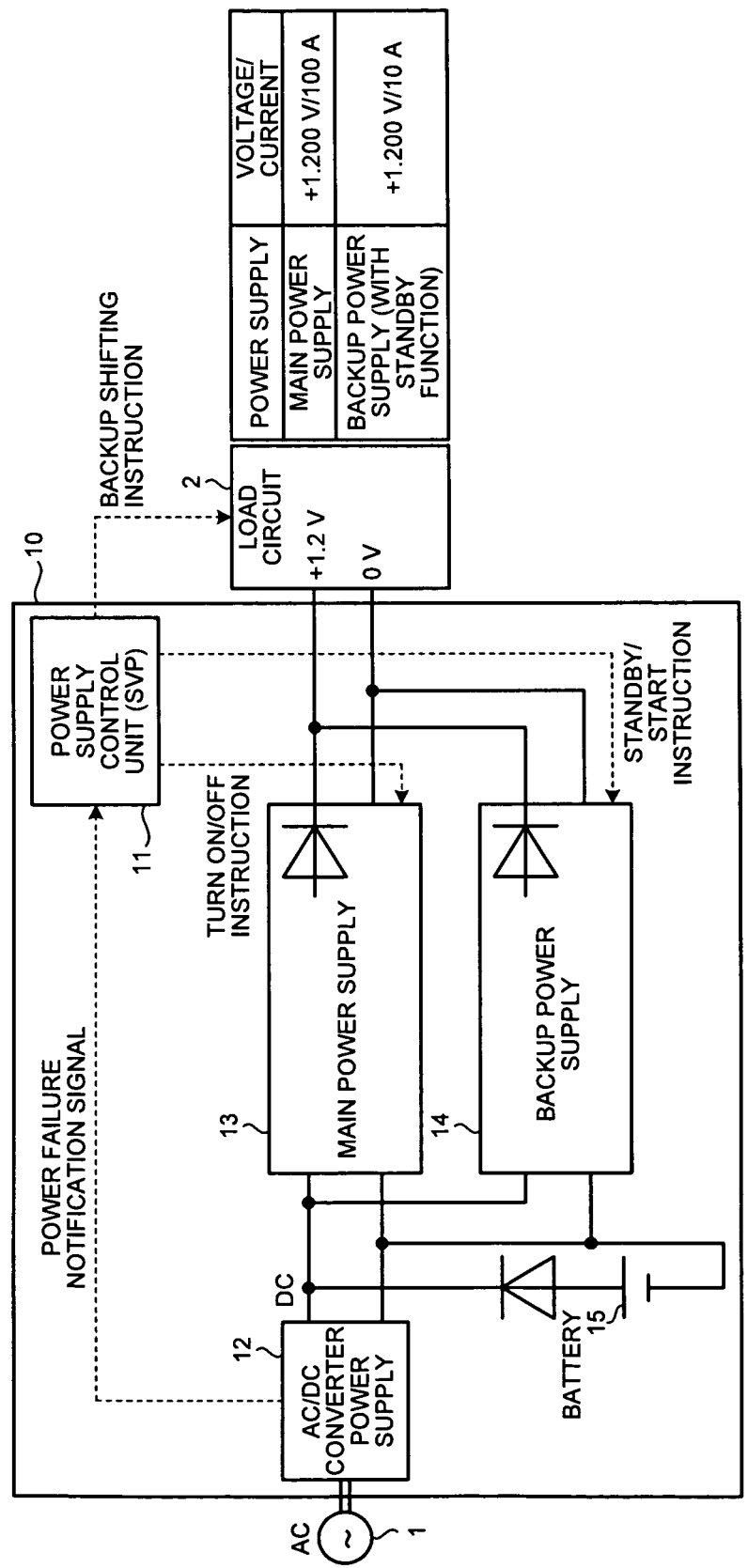
FIG. 1 is a diagram illustrating, in outline, the configuration of a power supply apparatus according to an embodiment.
Figure 2:
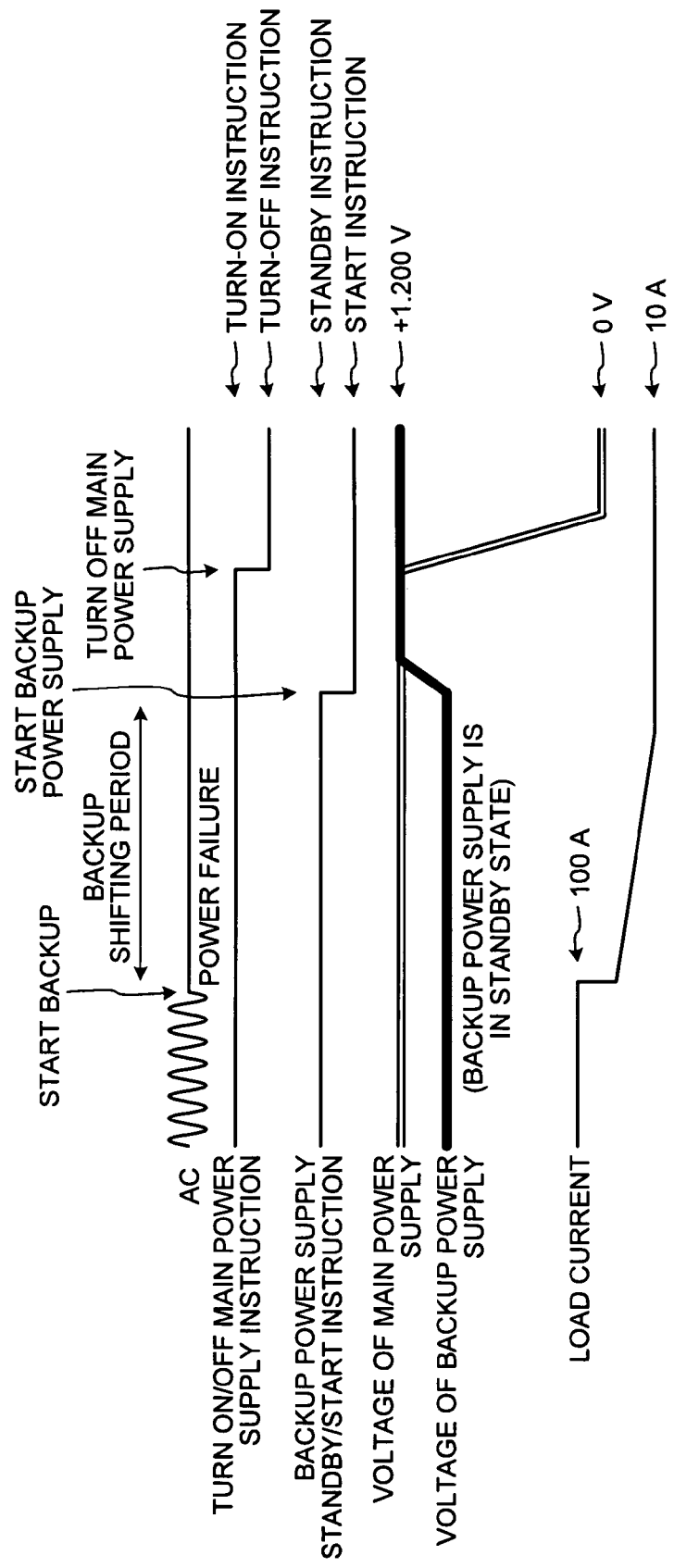
FIG. 2 is a diagram explaining an operation performed by the power supply apparatus illustrated in FIG. 1.

FIG. 1 is a diagram illustrating, in outline, the configuration of a power supply apparatus according to an embodiment. FIG. 2 is a diagram explaining an operation performed by the power supply apparatus illustrated in FIG. 1. FIG. 3 is a diagram illustrating, in outline, the configuration of a comparative example with which the configuration illustrated in FIG. 1 is compared. FIG. 4 is a schematic diagram explaining an operation of the comparative example illustrated in FIG. 3.

As illustrated in FIG. 1, a power supply apparatus 10 according to the embodiment is connected to an alternating current (AC) power supply 1 and a load circuit 2. The load circuit 2 is, for example, an information processing apparatus, and the load voltage thereof is +1.2 V.

The power supply apparatus 10 has therein a power supply control unit 11, an AC/DC (Alternating Current to Direct Current) converter power supply 12, a main power supply 13, a backup power supply 14, and a battery 15.

The power supply control unit 11 is a control device that controls the operation of the power supply apparatus 10 and is also referred to as a service processor (SVP). Specifically, if the AC power supply 1 is stopped, the power supply control unit 11 receives a power failure notification signal from the AC/DC converter power supply 12; sends, to the load circuit 2, a backup shifting instruction; and controls the operation of the main power supply 13 and the backup power supply 14.

The AC/DC converter power supply 12 is a converter that converts the output of the AC power supply 1 to a direct current (DC). The output of the AC/DC converter power supply 12 is supplied to the main power supply 13, the backup power supply 14, and the battery 15. Furthermore, if the AC/DC converter power supply 12 detects that the AC power supply 1 has stopped, the AC/DC converter power supply 12 sends a power failure notification signal to the power supply control unit 11.

The battery 15 is a rechargeable battery charger that is charged using electrical power supplied from the AC/DC converter power supply 12.

If the AC power supply 1 is in operation, the main power supply 13 supplies, to the load circuit 2 using electrical power supplied from the AC/DC converter power supply 12, an output of 100 A at 1.2 V. Furthermore, if the AC power supply 1 is in the stopped state, the main power supply 13 supplies, to the load circuit 2 using electrical power stored in the battery 15, an output of 100 A at 1.2 V. The main power supply 13 is turned on and off in accordance with a turn on/off instruction from the power supply control unit 11. The turn on/off instruction is configured such that, for example, a "turn-on instruction" is indicated when the voltage value of a signal is in the high state, whereas a "turn-off instruction" is indicated when the voltage value of a signal is in the low state.

The backup power supply 14 outputs a different voltage depending on the standby state and the start state. The standby state and the start state are switched in accordance with an instruction from the power supply control unit 11. In the standby state, the output voltage of the backup power supply 14 is lower than that of the main power supply 13. Specifically, the output voltage of the backup power supply 14 in a standby state is set in such a manner that the upper limit of the voltage fluctuation range is smaller than the lower limit of the output voltage fluctuation range of the main power supply. The output voltage of the backup power supply 14 in the standby state can be outside the allowable range of the operation voltage of the load circuit 2.

If the AC power supply 1 is in operation, the backup power supply 14 that is in the start state supplies, to the load circuit 2 using electrical power supplied from the AC/DC converter power supply 12, an output of 10 A at 1.2 V. Furthermore, if the AC power supply 1 is in the stopped state, the backup power supply 14 in the start state supplies, to the load circuit 2 using electrical power stored in the battery 15, an output of 10 A at 1.2 V.

Switching between the standby state and the start state of the backup power supply 14 is performed in accordance with a standby/start instruction from the power supply control unit 11. The standby/start instruction is configured such that, for example, a "standby instruction" is indicated when the voltage value of a signal is in the high state, and a "start instruction" is indicated when a voltage value of a signal is in the low state.

Furthermore, each of the main power supply 13 and the backup power supply 14 has a backflow prevention diode to regulate the current direction so that it conforms to the direction of the load circuit 2.

As illustrated in FIG. 2, if the AC power supply 1 is in operation, the power supply control unit 11 allows the main power supply 13 to operate and the backup power supply 14 to be in the standby state. Both the main power supply 13 and the backup power supply 14 are connected to the load circuit 2. When the backup power supply 14 is in the standby state, the output voltage of the backup power supply 14 is lower than that of the main power supply 13. Accordingly, the main power supply 13 supplies electrical power to the load circuit 2. Furthermore, the load circuit 2 is in the normal operating state and performs arithmetic processing; therefore, a load current thereof is set, for example, to 100 A.

If a power failure state occurs due to the AC power supply 1 stopping, by sending a backup shifting instruction to the load circuit 2, the power supply control unit 11 starts a backup. Upon receiving the backup shifting instruction, the load circuit 2 gradually ends the arithmetic processing. In accordance with the end of the arithmetic processing, the load current is gradually reduced and stabilized at the amount of current that is used for memory retaining, in the example illustrated in FIG. 2, at 10 A.

The power supply control unit 11 starts the backup power supply 14 a predetermined period of elapsed time after a backup is started. The predetermined period of time is the time required for the load current of the load circuit 2 to be sufficiently reduced. A predetermined period of time from when the backup is started until the backup power supply 14 is started can be set, in advance, as a backup shifting period.

If the backup power supply 14 is started, the voltage thereof rises to 1.2 V that is the same voltage as the main power supply 13. The power supply control unit 11 stops the main power supply 13 after the voltage of the backup power supply 14 has risen to 1.2 V.

A power supply apparatus 20 of the comparative example illustrated in FIG. 3 is connected to the AC power supply 1 and a load circuit 3. The load circuit 3 is, for example, an information processing apparatus, and the load voltage thereof is +3.3 to 3.432 V.

The power supply apparatus 20 has therein a power supply control unit 21, an AC/DC converter power supply 22, a main power supply 23, a backup power supply 24, and a battery 25.

The power supply control unit 21 is a control device, i.e., a service processor, that controls the operation of the power supply apparatus 20. Specifically, if the AC power supply 1 is stopped, the power supply control unit 21 receives a power failure notification signal from the AC/DC converter power supply 22; sends, to the load circuit 3, a backup shifting instruction; and controls the operation of the main power supply 23 and the backup power supply 24.

The AC/DC converter power supply 22 is a converter that converts an output of the AC power supply 1 to a direct current. The output of the AC/DC converter power supply 22 is supplied to the main power supply 23, the backup power supply 24, and the battery 25. Furthermore, when the AC/DC converter power supply 22 detects that the AC power supply 1 has stopped, the AC/DC converter power supply 22 sends a power failure notification signal to the power supply control unit 21.

The battery 25 is a rechargeable battery charger that is charged using electrical power supplied from the AC/DC converter power supply 22.

If the AC power supply 1 is in operation, the main power supply 23 supplies, to the load circuit 3 using electrical power supplied from the AC/DC converter power supply 22, an output of 100 A at 3.432 V. Furthermore, if the AC power supply 1 is in the stopped state, the main power supply 23 supplies, to the load circuit 3 using electrical power stored in the battery 25, an output of 100 A at 3.432 V. The main power supply 23 is turned on and off in accordance with a turn on/off instruction from the power supply control unit 21. The turn on/off instruction is configured such that, for example, a "turn-on instruction" is indicated when the voltage value of a signal is in a high state, whereas a "turn-off instruction" is indicated when the voltage value of a signal is in a low state.

If the AC power supply 1 is in operation, the backup power supply 24 supplies to the load circuit 3 using electrical power supplied from the AC/DC converter power supply 22, an output of 10 A at 3.3 V. Furthermore, if the AC power supply 1 is in the stopped state, the backup power supply 24 supplies, to the load circuit 3 using electrical power stored in the battery 25, an output of 10 A at 3.3 V. An on/off control of the backup power supply 24 is performed in accordance with a turn on/off instruction from the power supply control unit 21. The turn on/off instruction is configured such that, for example, a "turn-on instruction" is indicated when the voltage value of a signal is in a high state, whereas a "turn-off instruction" is indicated when the voltage value of a signal is in a low state.

Furthermore, each of the main power supply 23 and the backup power supply 24 has a backflow prevention diode to regulate the current direction so that it conforms to the direction of the load circuit 3.

As illustrated in FIG. 4, if the AC power supply 1 is in operation, the power supply control unit 21 allows both the main power supply 23 and the backup power supply 24 to be in the operating state. Both the main power supply 23 and the backup power supply 24 are connected to the load circuit 3. The output voltage of the backup power supply 24 is lower than that of the main power supply 23. Accordingly, if the main power supply 23 is in the operating state, the main power supply 23 supplies electrical power to the load circuit 3. Furthermore, the load circuit 3 is in the normal operating state and performs arithmetic processing; therefore, the load current thereof is set to 100 A.

If a power failure state occurs due to the AC power supply 1 stopping, by sending a backup shifting instruction to the load circuit 3, the power supply control unit 21 starts a backup. Upon receiving the backup shifting instruction, the load circuit 3 gradually ends the arithmetic processing. In accordance with the end of the arithmetic processing, the load current is gradually reduced and stabilized at the amount of current that is used for memory retaining, in the example illustrated in FIG. 4, at 10 A.

The power supply control unit 21 stops the main power supply 23 a predetermined period of elapsed time after a backup is started. The predetermined period of time is the time required for a load current of the load circuit 3 to be sufficiently reduced. A predetermined period of time from when the backup is started until the main power supply 23 is stopped can be set, in advance, as a backup shifting period.

FIGS. 5A and 5B are graphs exhibiting the efficiency of a main power supply and a backup power supply, respectively. As illustrated in FIGS. 5A and 5B, the efficiency of power conversion is improved as electrical power consumption of the power supply increases. The main power supplies 13 and 23 are designed on the assumption that the load current thereof is 100 A and that this corresponds to the consumption current in the normal operating state. The backup power supplies 14 and 24 are designed on the assumption that the load current thereof is 10 A and that this corresponds to a consumption current during a backup mode.

FIG. 6 is a schematic diagram explaining a loss of the main power supply and the backup power supply during a backup mode in a comparative example. If electrical power is supplied from the main power supply 13 during a backup mode, the load current is too small, which causes the power conversion efficiency to be about 50%, resulting in an electrical power loss of 34.3 W. In contrast, with the backup power supply 24, the power conversion efficiency is about 80%, resulting in an electrical power loss of 8.3 W.

However, if electrical power is supplied, during a normal operation, from the backup power supply 24 to the load circuit 3, there is a possibility that the backup power supply 24 may go down due to, for example, abnormal temperatures because the power supply does not meet demand. Accordingly, in the comparative example, the voltage of the main power supply 23 is set to +3.432 V, which is about 4% higher than the voltage of the backup power supply 24, i.e., +3.300 V, and electrical power is supplied form the main power supply 23 during a normal operation.

In the comparative example, because the load voltage is high, even when a difference between an output voltage of the main power supply 23 and an output voltage of the backup power supply 24 is set to be sufficiently large, both the output voltage of the main power supply 23 and that of the backup power supply 24 can be within the operating voltage allowable range of the load circuit 3.

However, if the load voltage becomes low, it is impossible to set a voltage difference between the main power supply and the backup power supply that is within the operating voltage allowable range. Accordingly, with the power supply apparatus 10, the main power supply 13 and the backup power supply 14 are configured to have the same set voltage. During a normal operation, to prevent electrical power from being supplied from the backup power supply 14 to the load circuit 2, the power supply apparatus 10 operates the power supply control unit 11 to give a standby instruction with respect to the backup power supply 14 so that the backup power supply 14 is on standby at a voltage lower than that of the main power supply 13.

The backup power supply 14 outputs a voltage even when it is in the standby state. The reason for that is to make sure that the backup power supply 14 has not failed its operation even in the normal operation state because if the backup power supply 14 fails and if that state is found when a backup is performed, the backup cannot be performed.

Figure 7:
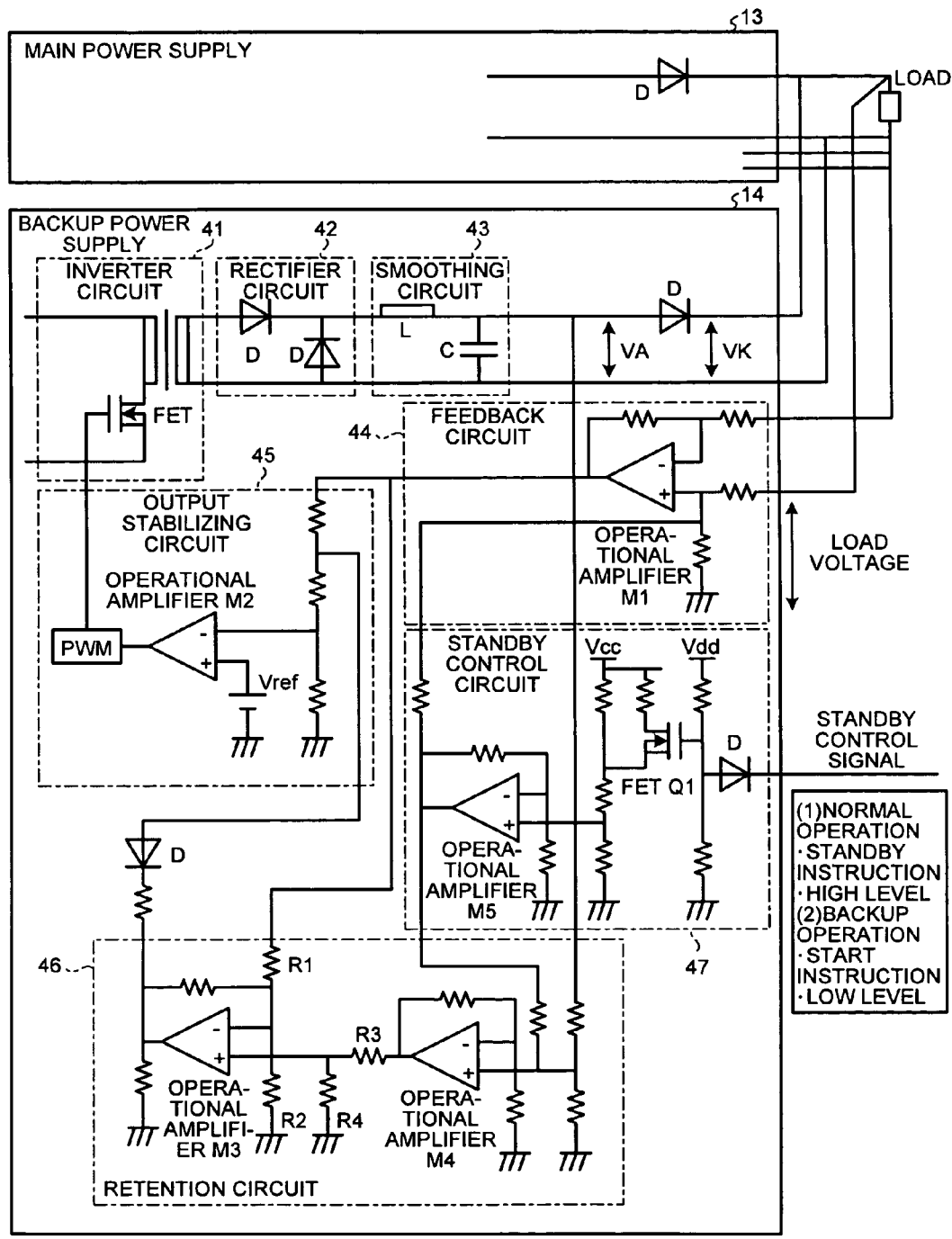
FIG. 7 is a circuit diagram of a backup power supply 14.

FIG. 7 is a circuit diagram of the backup power supply 14. The backup power supply 14 has an inverter circuit 41, a rectifier circuit 42, a smoothing circuit 43, a feedback circuit 44, an output stabilizing circuit 45, a retention circuit 46, and a standby control circuit 47.

The inverter circuit 41 converts the input voltage of the backup power supply 14 to a low voltage for loading. The rectifier circuit 42 and the smoothing circuit 43 convert it to a DC voltage. The feedback circuit 44 detects the load voltage. The output stabilizing circuit 45 maintains the load voltage at a constant voltage.

If the main power supply 13 is still in the on state when the backup power supply 14 is started, the retention circuit 46 maintains the output voltage of the backup power supply 14 to prevent, even when the output set voltage of the main power supply 13 is high, the backup power supply 14 from being stopped due to the output voltage of the backup power supply 14 being made too low. For example, the retention circuit 46 maintains the output voltage equal to or greater than VA=VK×0.75, where VA represents the output voltage of the backup power supply 14, and VK represents the output voltage of the main power supply 13.

If the standby control circuit 47 receives a standby instruction, the standby control circuit 47 allows the backup power supply 14 to be in the standby state by setting VA to −3 to −10% of VK. Furthermore, if the standby control circuit 47 receives a start instruction during a backup mode, the standby control circuit 47 controls the backup power supply 14 in such a manner that it outputs a load voltage of 1.2 V.

FIG. 8 is a schematic diagram explaining an operation of the backup power supply 14. In normal operation, in which electrical power is supplied from the AC power supply 1, a standby instruction as a standby control signal is input to the standby control circuit 47. Accordingly, a transistor Q1 enters the on state, and the output of an operational amplifier M5 in the standby control circuit 47 becomes high. As a result, the output of an operational amplifier M1 in the feedback circuit 44 becomes high, and an operational amplifier M2 in the output stabilizing circuit 45 acts to lower the VA. At the same time, because the voltage of the negative (−) terminal of the operational amplifier M3 in the retention circuit 46 becomes high, the operational amplifier M3 limits the lowest value of VA by controlling the operational amplifier M2.

Output voltage VA of the backup power supply 14 is substantially determined in accordance with the values of resistance R1 to R4 in the retention circuit 46. Accordingly, resistance values of R1 to R4 are set so as to obtain the following relation, and the output of the backup power supply 14 is made to be in the standby state:

$$R1=R2=R4>R3 \text{ and } VA=VK\times(0.97 \text{ to } 0.9)$$

In contrast, during a backup mode, a start instruction is input to the standby control circuit 47 as a standby control signal. Accordingly, a transistor Q1 enters the off state. By adjusting a constant in such a manner that the output of the operational amplifier M5 in the standby control circuit 47 becomes a voltage equal to that of the positive (+) terminal of the operational amplifier M1 in the feedback circuit 44, i.e., a voltage fed back from the load voltage, the output of the operational amplifier M1 in the feedback circuit 44 feeds back the state of the load voltage. The operational amplifier M2 in the output stabilizing circuit 45 keeps the load voltage constant on the basis of information on the load voltage received from the operational amplifier M1 in the feedback circuit 44.

In the example illustrated in FIGS. 7 and 8, a description is given of a case in which the standby control circuit 47 controls the voltage during the standby state in accordance with the output voltage of the main power supply 13; however, the configuration is not limited thereto. For example, it is also possible to control, in accordance with the load voltage, the output voltage in such a manner that a constant voltage, for example, −20% of the load voltage, is output.

Figure 9:
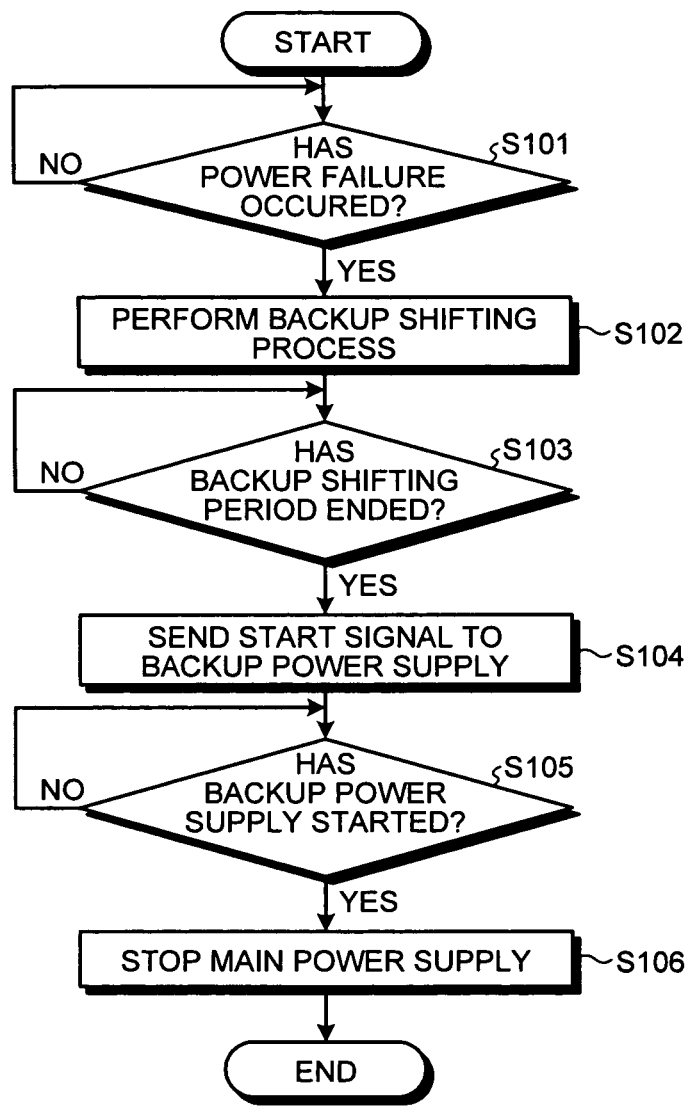
FIG. 9 is a flowchart explaining an operation performed by a power supply control unit 11 when shifting to a backup.

FIG. 9 is a flowchart explaining an operation performed by the power supply control unit 11 when a state shifts to a backup. When the AC power supply 1 is in operation, the power supply control unit 11 operates the main power supply 13 and observes any power failure while allowing the backup power supply 14 to be in the standby state.

When the power supply control unit 11 receives a power failure notification signal (Yes at S101), the power supply control unit 11 sends, to the load circuit 2, a backup shifting instruction to allow the load circuit 2 to perform a backup shifting process (S102). Then, the power supply control unit 11 observes whether a backup shifting period ends. If the backup shifting period ends (Yes at S103), the power supply control unit 11 sends, to the backup power supply 14, a start signal (S104). Thereafter, if the backup power supply 14 is started (Yes at S105), the power supply control unit 11 stops the main power supply 13 (S106) and ends the shift to the backup state.

FIG. 10 is a flowchart explaining an operation performed by the power supply control unit 11 when a backup is restored. When the AC power supply 1 is in the stopped state, the power supply control unit 11 stops the main power supply 13 and observes the restoration of power (power failure recovery) while allowing the backup power supply 14 to be in the start state.

When a power failure notification signal is released (Yes at S201), the power supply control unit 11 sends a start signal to the main power supply 13 (S202). Then the power supply control unit 11 checks whether the main power supply 13 is started (S203). If the main power supply 13 is successfully started (Yes at S203), the power supply control unit 11 shifts the backup power supply 14 to the standby state (S204). Subsequently, after the backup power supply 14 shifts to the standby state (Yes at S205), the power supply control unit 11 allows the load circuit 2 to perform a restoring process for restoring the state from the backup state (S206) and returns to the normal operation.

As described above, with the power supply apparatus and the power supply control method according to the embodiment, the main power supply 13 and the backup power supply 14 are configured to have the same set voltage. During normal operation, to prevent electrical power from being supplied from the backup power supply 14 to the load circuit 2, the power supply control unit 11 gives a standby instruction, to the backup power supply 14, to allow the backup power supply 14 to be on standby at a voltage lower than that of the main power supply 13. As a result, even when the load voltage is low, it is possible to efficiently switch between the main power supply and the backup power supply and to implement low electrical power consumption by reducing electrical power loss.

According to an aspect of the present invention, it is possible to efficiently switch, with respect to a load circuit having a low load voltage, between a first power supply circuit and a second power supply circuit. Furthermore, it is also possible to obtain a power supply apparatus and a power supply control method that implements low electrical power consumption by reducing electrical power loss.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A power supply apparatus comprising:
    a converter circuit that converts an alternating current output from an AC power supply to a direct current;
    a battery that is charged by the direct current output from the converter circuit;
    a first power supply circuit that outputs a first voltage that is within an allowable range of a load voltage of a load circuit from either one of the converter circuit and the battery to a load circuit;
    a second power supply circuit that outputs either one of a second voltage that is within the allowable range and a third voltage that is lower than the first voltage from either one of the converter circuit and the battery to the load circuit; and
    a power supply control unit that causes the first power supply circuit to output the first voltage and causes the second power supply circuit to output the third voltage, when the alternating current is output from the AC power supply, and the power supply control unit causing the second power supply circuit to output the second voltage and causes the first power supply circuit to stop outputting the first voltage, when the AC power supply is stopped, and
    wherein the outputting by the second power supply circuit outputs a different voltage depending on a state of the power supply apparatus being one of a standby state and a start state, the state chosen in accordance with an instruction from the power supply control unit and where the power supply apparatus outputs, while in the standby state, a voltage that is lower than the voltage output from the first power supply circuit.

2. The power supply apparatus according to claim 1, wherein the first voltage is the same as the second voltage.

3. The power supply apparatus according to claim 1, wherein the third voltage is lower than a lower limit of the allowable range.

4. The power supply apparatus according to claim 1, wherein the second power supply circuit includes a control circuit that receives the first voltage to control the third voltage.

5. The power supply apparatus according to claim 1, wherein the power supply control unit instructs the load circuit to shift to a backup state and then allows the second power supply circuit to output the second voltage to the load circuit, when the AC power supply is detected as stopped.

6. A method of controlling a power of a power supply apparatus for supplying a current to a load circuit, the method comprising:
    converting an alternating current output from an AC power supply to a direct current;
    charging a battery included in the power supply apparatus using the direct current output from the converter circuit;
    outputting a first voltage that is within an allowable range of a load voltage of the load circuit from either one of a converter circuit and the battery to the load circuit by a first power supply circuit included in the power supply apparatus;
    outputting either one of a second voltage that is within the allowable range and a third voltage that is lower than the first voltage from either one of the converter circuit and the battery to the load circuit by a second power supply circuit included in the power supply apparatus;
    causing the first power supply circuit to output the first voltage and causing the second power supply circuit to output the third voltage through a power supply control unit included in the power supply apparatus, when the alternating current is output from the AC power supply; and
    causing the second power supply circuit to output the second voltage and causing the first power supply circuit to stop outputting the first voltage through the power supply control unit, when the AC power supply is stopped, and
    wherein the outputting by the second power supply circuit outputs a different voltage depending on a state of the power supply apparatus being one of a standby state and a start state, the state chosen in accordance with an instruction from the power supply control unit and where the power supply apparatus outputs, while in the standby state, a voltage that is lower than the voltage output from the first power supply circuit.

* * * * *